US010135769B2

(12) United States Patent
Shi

(10) Patent No.: US 10,135,769 B2
(45) Date of Patent: Nov. 20, 2018

(54) ELECTRONIC COMMUNICATION SYSTEM

(71) Applicants: Boogoo Intellectual Property LLC, Westlake Village, CA (US); Jiazheng Shi, Campbell, CA (US)

(72) Inventor: Jiazheng Shi, Campbell, CA (US)

(*) Notice: Subject to any disclaimer, the term of this patent is extended or adjusted under 35 U.S.C. 154(b) by 260 days.

(21) Appl. No.: 15/041,056

(22) Filed: Feb. 11, 2016

(65) Prior Publication Data
US 2016/0277342 A1 Sep. 22, 2016

Related U.S. Application Data

(63) Continuation-in-part of application No. 14/658,238, filed on Mar. 16, 2015, now abandoned.

(51) Int. Cl.
*H04L 12/58* (2006.01)
(52) U.S. Cl.
CPC .............. *H04L 51/16* (2013.01); *H04L 51/04* (2013.01)
(58) Field of Classification Search
CPC .................................. H04L 51/04; H04L 51/16
See application file for complete search history.

(56) References Cited

U.S. PATENT DOCUMENTS

| | | | |
|---|---|---|---|
| 7,506,263 B1 | 3/2009 | Johnston et al. | |
| 7,707,257 B2 | 4/2010 | Taieb et al. | |
| 8,510,664 B2 | 8/2013 | Rueben et al. | |
| 2004/0044735 A1 | 3/2004 | Hoblit | |
| 2007/0005715 A1* | 1/2007 | LeVasseur | G06Q 10/107 709/206 |
| 2015/0200879 A1* | 7/2015 | Wu | H04L 51/046 715/758 |

* cited by examiner

*Primary Examiner* — June Y Sison
(74) *Attorney, Agent, or Firm* — Jigang Jin

(57) ABSTRACT

An electronic communication system for sending, receiving, storing, organizing, displaying, and sharing electronic messages and content (e.g., text, image, audio, and video) is described. The electronic communication system provides a platform where users can communicate and share information with each other. For example, a user can create a conversation thread and invite other users to join the thread. They can send messages and other content via the thread and protect them by assigning different confidentiality levels and expiration restrictions. Furthermore, the electronic communication system provides a "two-dimensional" messaging mechanism, through which a user can select a particular message communicated with another user in a first Thread to follow up on that particular message with the same other user in a new Thread.

6 Claims, 12 Drawing Sheets

ELECTRONIC COMMUNICATION SYSTEM

CROSS-REFERENCE TO RELATED APPLICATIONS

This application is a continuation-in-part (CIP) application of U.S. patent application Ser. No. 14/658,238, filed Mar. 16, 2015, the content of which is incorporated herein by reference in its entirety. The subject matter of this application is related to the subject matter of co-pending U.S. patent application Ser. No. 14/789,993, filed Jul. 2, 2015, the subject matter of co-pending U.S. patent application Ser. No. 14/864,865, filed Sep. 25, 2015, the subject matter of co-pending U.S. patent application Ser. No. 14/864,960, filed Sep. 25, 2015, which is a divisional of U.S. patent application Ser. No. 14/864,865, and the subject matter of co-pending U.S. patent application Ser. No. 14/878,177, filed Oct. 8, 2015, which is a CIP application of U.S. patent application Ser. No. 14/864,865.

FIELD OF INVENTION

This invention relates to an electronic communication system for sending, receiving, storing, organizing, displaying, and sharing electronic messages and content.

BACKGROUND OF THE INVENTION

Electronic mail ("email") has been a traditional means of electronic communication between/among people. Various types of documents (e.g., Microsoft Word, PDF, and JPEG) can be sent along with emails as attachments. A person can send an email to multiple recipients to deliver or share information. Typically, an email system requires an email server (or multiple email servers) to store, organize, and transfer emails from one user to another. Users send, receive, and view their emails via client-side applications, such as Microsoft Outlook, Eudora, Apple Mail, or web-based email clients (e.g., Gmail, Yahoo Mail, or Hotmail). Although email is the most popular formal electronic communication means nowadays, it is neither suitable nor generally used for real-time electronic communications.

Instant messaging allows users to communicate with each other in real-time over wired or wireless networks. In the very beginning of the development of this technology, instant messaging only supported real-time text message exchanges. Today, more advanced instant messaging applications have added file transfer, clickable hyperlinks, Voice over IP, and/or video chat capabilities. Although it is less formal than email, instant messaging provides people a quick and easy way of communicating or sharing information. With the development of mobile technologies, instant messaging via mobile devices (e.g., smartphones) are becoming the mainstream means for communications or sharing information between/among people.

However, both email and instant messaging have their own shortcomings. For example, current email applications focus on the management of individual messages rather than focusing on the collaboration between/among users. As such, emails can be sorted or organized based on the time of arrival or by subject line, but it is difficult to present the messages in a way that the collaboration between/among users would appear clear and easy to follow. It is also difficult to manage documents or content attached to emails. Users need to download them to a local space first and then organize them manually.

Another drawback of email is that a user must have an email account to communicate with others. Email accounts, particularly those offered by free email services (e.g., Gmail, Yahoo Mail, and Hotmail) are the main targets of spam, ads, or even malicious security attacks. Furthermore, more and more people are go mobile nowadays. It is difficult for users to handle regular email tasks on mobile devices. It is even more difficult for users to juggle among multiple emails to piece together information sent separately on mobile devices.

On the other hand, instant messaging focuses on the collaboration between/among users rather than focusing on the management of individual messages. For example, current instant messaging applications lack the ability of organizing messages by topic or subject matter. Specifically, when users communicate with each other in an instant messaging application, all messages exchanged between/among them will be stored and displayed chronologically disregard the topic or subject matter they are related to. As such, users need to manually identify messages that are related to a particular topic or subject matter in order to share the relevant information with others.

Thus, there is a need for a new electronic communication system that can overcome the above shortcomings.

SUMMARY OF THE INVENTION

In one embodiment of the present invention, an electronic communication system for sending, receiving, storing, organizing, displaying, and sharing electronic messages and content (e.g., text, image, audio, video) is described. Users have the flexibility to register in the system by using their emails, phone numbers, or instant messenger IDs. The electronic communication system provides a platform where users can communicate and share information with each other. For example, a user can initiate a conversation thread (hereinafter "Thread") in the system. Upon such request, the system will issue a unique identifier to identify the Thread (hereinafter "Thread ID"). The user can then send the Thread ID or a link associated with the Thread to others to invite them to join the Thread. Thus, as used in the present application, a Thread is a data structure or an object used to represent and/or organize a chain of messages communicated between two or more users in or through messaging environments. In addition, the electronic communication system allows users to organize their Threads and connections with other users, to specify the level of confidentiality of each of his messages and content, and to share certain selected messages or content with others.

In one embodiment, the electronic communication system is a web-based system. A Thread may be represented and displayed as a dynamic webpage. As such, users can use the system via web browsers, including mobile web browsers, and do not need to install special software on their computers, mobile devices, TV sets, or other smart appliances. Alternatively, the system may provide a customized client-side application.

The electronic communication system can not only protect messages or content in terms of confidentiality levels but also protect user identities. User identities such as email addresses, phone numbers, or instant messenger IDs can be encrypted before shown in a Thread. Alternatively, such identity information may not be shown in a Thread or may only be shown to certain selected users.

Furthermore, the electronic communication system provides users the option to communicate or access content via Threads without logging into the system, further protecting user identity and reducing the likelihood of man-in-the-middle attack.

In yet another embodiment, the electronic communication system provides a "two-dimensional" messaging platform allowing users to communicate with each other via a first Thread and create a second Thread to follow up on a particular message or the subject matter of the message communicated in the first Thread.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
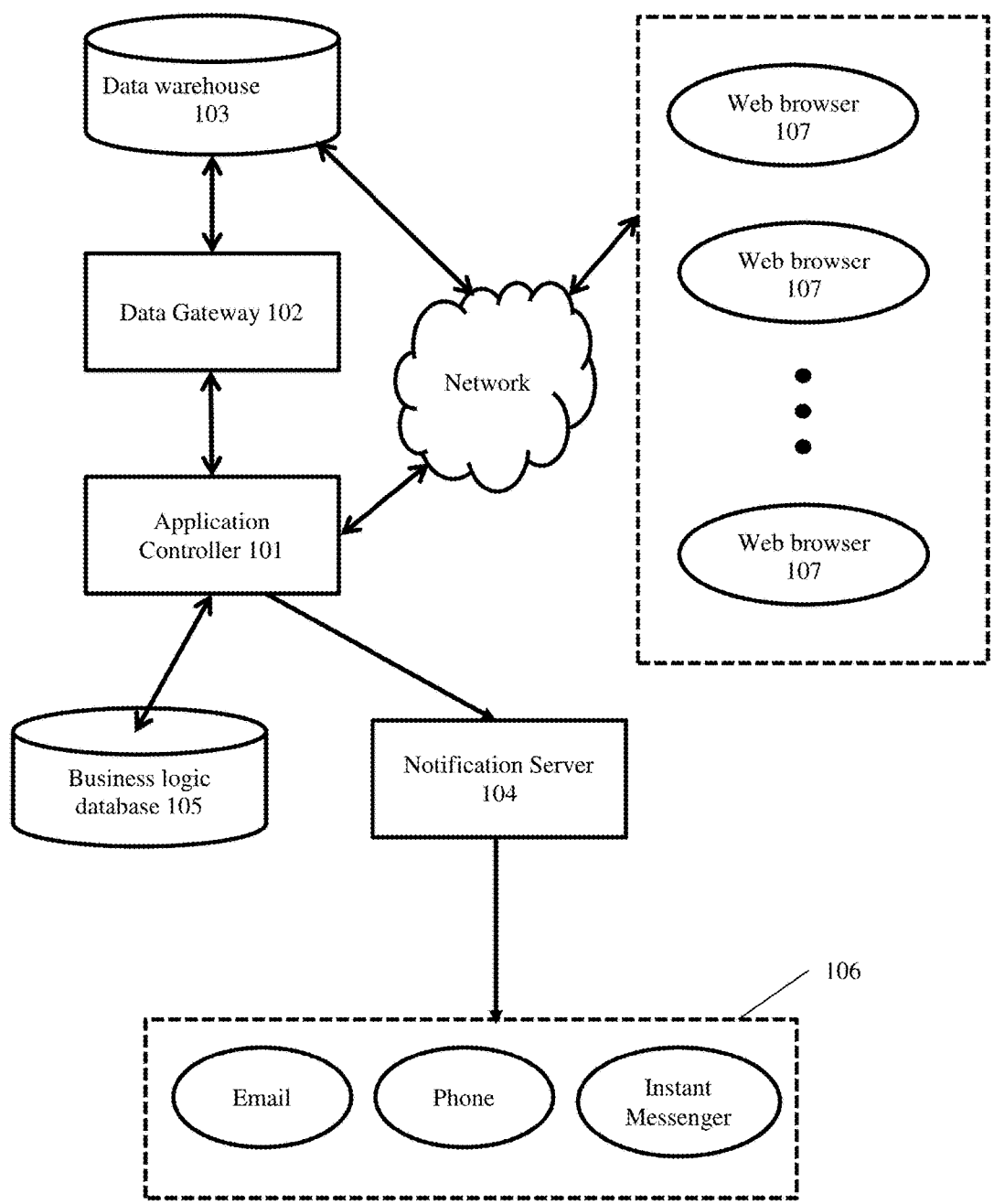
FIG. 1 is a system diagram illustrating the electronic communication system.

FIG. 1 is a system diagram illustrating an electronic communication system. In one embodiment, the electronic communication system 100 (or "System") includes an application controller 101, a data gateway 102, a data warehouse 103, a notification server 104, and a business logic database 105. In one embodiment, the application controller 101 contains or works with a web server, not shown in FIG. 1, to communicate with one or more web browsers 107 via wired or wireless networks, thus providing a platform for users to communicate with each other. For example, a user can login to the System and initiate a Thread to communicate with other user(s) via a web browser and its connection with the System. The initiating user has the option to list the target user he/she wants to communicate with by, for example, specifying the target user's email, phone number, or instant messenger ID. The application controller 101 first checks the business logic database 105 to determine whether the target user is already registered with the System. If not, the application controller 101 requests the notification server 104 to send a notification message to the target user's email, phone, or instant messenger 106. The notification message may include a URL link which identifies the Thread created by the initiating user. By clicking on the URL link, the target user can join the Thread to communicate with the initiating user.

Alternatively, a user can initiate a Thread without specifying any target user. Upon such request, the application controller 101 returns a URL link to the initiating user, who can manually send the URL link to others to invite them to join the Thread. In either case, the application controller 101 will generate a Thread ID to identify the Thread. In addition, a user can initiate a Thread without logging into the System. The System may trigger a confirmation request to the user. For example, instead of being displayed explicitly, the URL link is sent to the user's email address, phone, or instant messenger to verify that the Thread is initiated by the true identity. Of course, the System may display the URL link to the user, instead of triggering a confirmation request. And the System may link the Thread ID with a unique number associated with the user's device (e.g., International Mobile Station Equipment Identity, IP address).

Once a Thread is established, any user on the Thread (i.e., a user who has joined the Thread) can send a message, document, or any other type of content (e.g., photo, recorded or streaming video/audio, PDF file) to other user(s) on the Thread via a web browser 107. The application controller 101 receives the message, document, or content and forwards it or a reference of it to the data gateway 102, which may encrypt and/or compress the message, document, or content before storing it in the data warehouse 103. If necessary, the data gateway 102 can also convert the data format of the message, document, or content before the encryption and/or compression operation.

In addition, a user may share the Thread and certain messages and/or content in the Thread with another user who is not on the Thread yet by simply sending the URL link to this new user. The application controller 101 provides a confidentiality mechanism for users to specify and control the level of confidentiality of each of the messages and content he/she sent or uploaded. Through this mechanism, a user can control what he/she wants to share with other users. To implement this mechanism, the application controller 101 may assign a confidentiality level to a message, document, or content and maintain the confidentiality data in the business logic database 105. Alternatively, the confidentiality data can be maintained in the data warehouse 103 as well.

It should be noted that the application controller 101, data gateway 102, data warehouse 103, notification server 104, and business logic database 105 can operate or be implemented on a single server computer or multiple server computers. Also, the System can have multiple application controllers 101, data gateways 102, data warehouses 103, notification servers 104, and/or business logic databases 105 to increase its computing or servicing power. Furthermore, certain modules can be combined into one module. For example, the notification server 104 can be combined with the application controller 101 so that the combined module will serve the functions of both the application controller 101 and the notification server 104.

Figure 2:
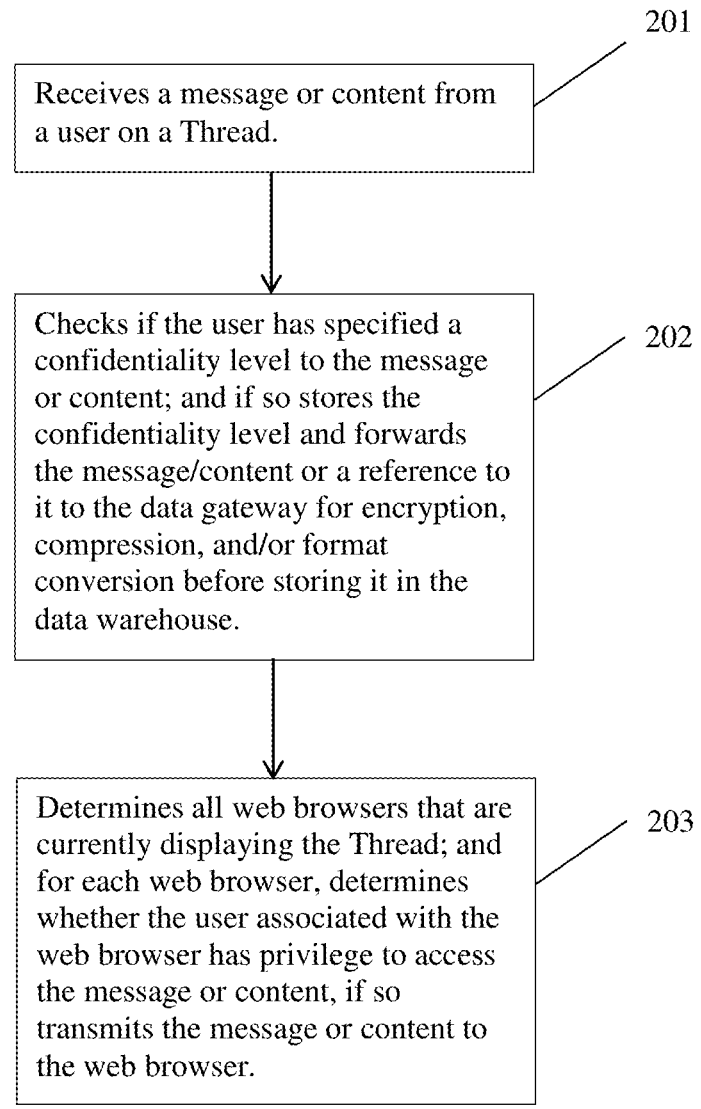
FIG. 2 is a flow diagram illustrating a process of transferring message or content between/among users in the electronic communication system.

FIG. 2 is a flow diagram illustrating a process of transferring message or content between/among users in the electronic communication system 100. It is assumed that a Thread has been created upon a request of a user at a web browser ("user A") and at least one other user ("user B") is on the Thread. At step 201, the process receives a message or content from user A. In one embodiment, user A can specify the confidentiality level of the message or content before sending it. For example, user A can specify that the message or content is to be shared only among the current users on the Thread. Thus, the message or content cannot be shared with anyone who is not on the Thread. This may be implemented by, for example, disabling the function of forwarding the message or content provided by the System. User A can also specify that the message or content can be freely shared with anyone, in which case user B can forward it to another user who is not on the Thread. Of course, other confidentiality levels can be implemented as well. For example, assuming user C is also on the Thread, user A can specify that the message or content is only shared with User C. In this case, User B will not be able to see the message or content.

At step 202, the process checks whether user A has specified a confidentiality level to the message or content. If so, the process stores the confidentiality level to the business logic database 105 and forwards the message or content (or a reference to the message or content) to the data gateway 102, which performs encryption, compression, and/or format conversion operations on the message or content before storing it in the data warehouse 103. Alternatively, the confidentiality level associated with the message or content can be stored in the data warehouse 103 or another database.

At step 203, the process determines all web browsers that are currently displaying the Thread. For each web browser, the System determines whether the user associated with the web browser (i.e., the user who is accessing the Thread via the particular web browser) has privilege to access the message or content; and if so, the System pushes the message or content to the web browser. Message pushing can be implemented through several mechanisms such as pushlet and long-polling. For example, the application controller 101 can maintain a list of current connections with web browsers and the Thread ID associated with each connection. To determine all web browsers that are currently displaying the Thread, the process just needs to search the list of connections with the Thread ID. Then, for each identified web browser, the process determines whether the user associated with the web browser has privilege to access the message or content; and if so, the System transmits the message or content to the web browser via the corresponding connection. For example, since user B is currently viewing the Thread on his/her web browser, the application controller 101 will identify the connection with user B's web browser and transmit the message or content to the web browser via the connection. Once user B's web browser receives the message or content, it will update its page to show the message or content. Alternatively, a link or reference to the message or content is transmitted to the web browser via the connection. User B can then follow the link or reference to receive the actual message or content stored in the data warehouse 103. However, in the case where user A specifies that only user C can view the message or content, the System will transmit the message or content to user C's web browser, not user B's web browser.

Figure 3:
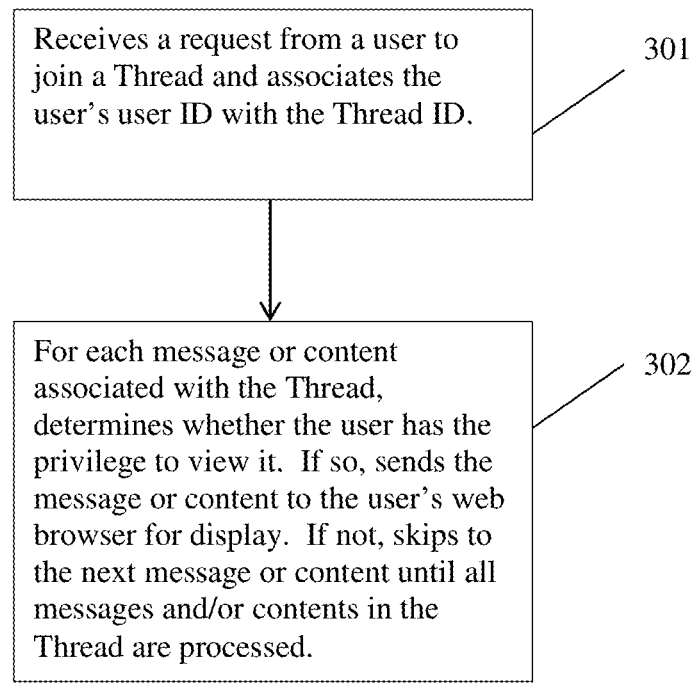
FIG. 3 is a flow diagram illustrating a process of adding a user to a thread.

FIG. 3 is a flow diagram illustrating a process of adding a user to a Thread. Continuing with the above example, assuming user B wants to ask user D to join the Thread. For example, user B can send a URL link identifying the Thread to user D. User D can click on the URL link to launch a web browser. The web browser then sends a request to the System via a network connection to join the Thread. At step 301, the process receives the request from user D. The process determines the Thread ID from the request and determines whether user D is already on the Thread. If not, the process will associate user D's User ID with the Thread ID to represent that user D is now on the Thread.

At step 302, for each message or content associated with the Thread, the process determines whether user D has the privilege to view it. If so, the process sends the message or content (or a reference to the message/content) to user D's web browser for display. If not, the process skips to the next message or content until all messages and/or content in the Thread are processed.

In one embodiment, the process illustrated in FIG. 3 can be triggered when a user tries to communicate with another user who is not yet registered with the System. In that case, the first user sends a request to the System to create a Thread. Then, the user sends a URL link identifying the Thread to the other user's email, phone, or instant messenger. If the other user clicks on the URL link, the System registers the other user first, issues a User ID to the other user and associates it with the Thread ID. Then, the process goes through step 302 as described above.

One particular advantage of the System is that people can establish a Thread to communicate with each other without revealing their actual emails, phone numbers, or instant messenger IDs. Thus, the System protects user privacy while allowing users to freely communicate with each other online. In other cases, the System can create a QR code or other type of code to represent the Thread. Other users can simply scan the code with their mobile devices to join the Thread. Thus, there is no need to send the URL link identifying the Thread to their emails, phones, or instant messengers, as described in step 302. This is particularly useful in the case where a company starts a Thread to promote a product. The company invites potential customers to join the Thread to follow the product and to provide comments or feedbacks. Potential customers can scan a QR code to join the Thread to follow the product and view relevant information about the product without revealing their names or contact information.

In another embodiment, the System can create a Thread and associate it with a domain name so that the Thread becomes part of a webpage under the domain name. This is particularly useful for building a dynamic and user interactive website. For example, a family can use the Thread to build a family discussion forum where family members can communicate with each other, share photos, and even share certain information with outsiders.

As mentioned earlier, the System provides an information protection mechanism that allows a user to specify a level of confidentiality to a message or content he/she submitted to the System. In addition, a user can make certain information available to other users and specify an expiration time for such access. Like the confidentiality data, the expiration time data can also be stored in a database in association with the corresponding message or content. When the System receives a request from a user to access a Thread, the System checks the identity of the user (e.g., User ID) and only sends the information (e.g., message, content) in the Thread that the user has the privilege to access to and has not expired yet.

In one embodiment, the information protection mechanism is implemented with tokens. When a user joins a Thread via a web browser, the System creates a token and distributes the token to the web browser. The token may be a randomly generated code or number, such as Globally Unique Identifier (GUID). In the alternative, the token may include the Thread ID and the user's User ID, in case the user has a User ID with the System, or a unique number associated with the user's device (e.g., International Mobile Station Equipment Identity, IP address), in case the user does not have an User ID with the System. The System may also encrypt the token to provide security protection. After creating a token, the System may assign an expiration time according to, for example, the identity and/or privilege level of the user to whom the token was assigned. In addition, the System may also assign the user's privilege level to the token to control which information in the Thread the user can access. Anytime the web browser sends a request to the System (e.g., a request to receive messages or content), the token is included as part of the request. Once the System receives the request (and the token included therein), the System checks whether the token has expired and whether the privilege level associated with the token permits access to a message or content. If the token expires, the user will not be permitted to access the Thread or information in the Thread.

Figure 4:
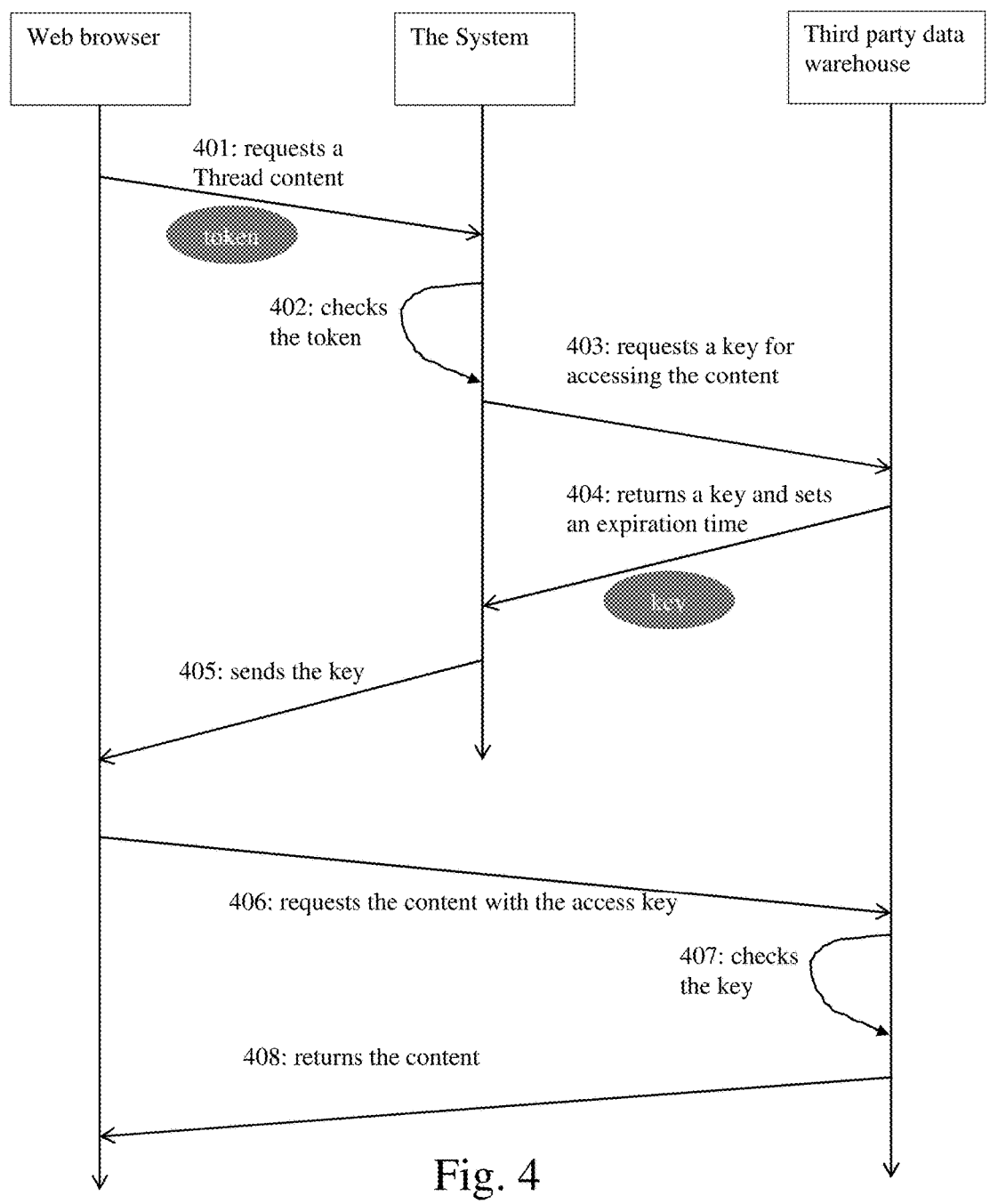
FIG. 4 is diagram illustrating the interaction among a web browser, the system, and a third party data warehouse when the web browser sends a request for content of a Thread.

In one embodiment, the System is configured to operate with a third party data warehouse, either with or without the existence of the internal data warehouse 103. FIG. 4 is a diagram illustrating the interaction among a web browser, the System, and the third party data warehouse when the web browser sends a request for content of a Thread. At step 401, the web browser sends a request to the system to request content of a Thread. For example, when a user clicks on a link to a video clip of the Thread in the web browser, the web browser generates such a request and sends it to the System. As discussed above, the request also includes a token distributed to the web browser from the System.

At step 402, the System receives the request and determines whether the token has expired. If the token has expired, the request will be denied. Or, the user may login to the System to renew a token. If the token is still valid, at step 403, the System sends a request to the third party data warehouse, where the content (e.g., video clip) is stored, to request a key for accessing the content.

At step 404, the third party data warehouse generates a key for accessing the content and sets an expiration time (e.g., in one day). Then, the third party data warehouse returns the key to the System.

At step 405, the System receives the access key and sends it to the web browser. At step 406, after receiving the access key, the web browser sends a request together with the access key to the third party data warehouse. At step 407, the third party data warehouse checks whether the access key is valid and has not expired. If the access key is valid and has not expired, the third party data warehouse will return the content to the web browser. The access key can be cached in the web browser so that the user can send a second request to access the content without going through steps 401 through 405, provided the access key has not expired.

The system can revoke a token before it expires in any circumstances if the information owner decides to terminate sharing with other users. The system can also request the third party data warehouse to revoke the keys associated with the token.

The process illustrated in FIG. 4, particularly the process operated on the System, can be configured to work together with the process illustrated in FIG. 2 or FIG. 3. For example, when a user uploads content to a Thread according to the process illustrated in FIG. 2, the application controller determines whether the content should be stored in the internal data warehouse 103, if there is, or in the third party data warehouse depending on, for example, the data size and/or type of the content. The application controller can also facilitate the establishment of a direct connection between the data warehouse 103 or the third party data warehouse and the web browser so that the content could be uploaded directly to the data warehouse. And if the content is stored in the third party data warehouse, the process in FIG. 2 or 3 may call the System's process illustrated in FIG. 4 to send the content to a web browser.

In one embodiment, the System 100 provides a "two-dimensional" messaging mechanism allowing users to communicate with each other via a first Thread and create a second Thread to follow up on a particular message or the subject matter of the message communicated in the first Thread. FIGS. 5-9 use an example to illustrate the concept of "two-dimensional" messaging.

Figure 5:
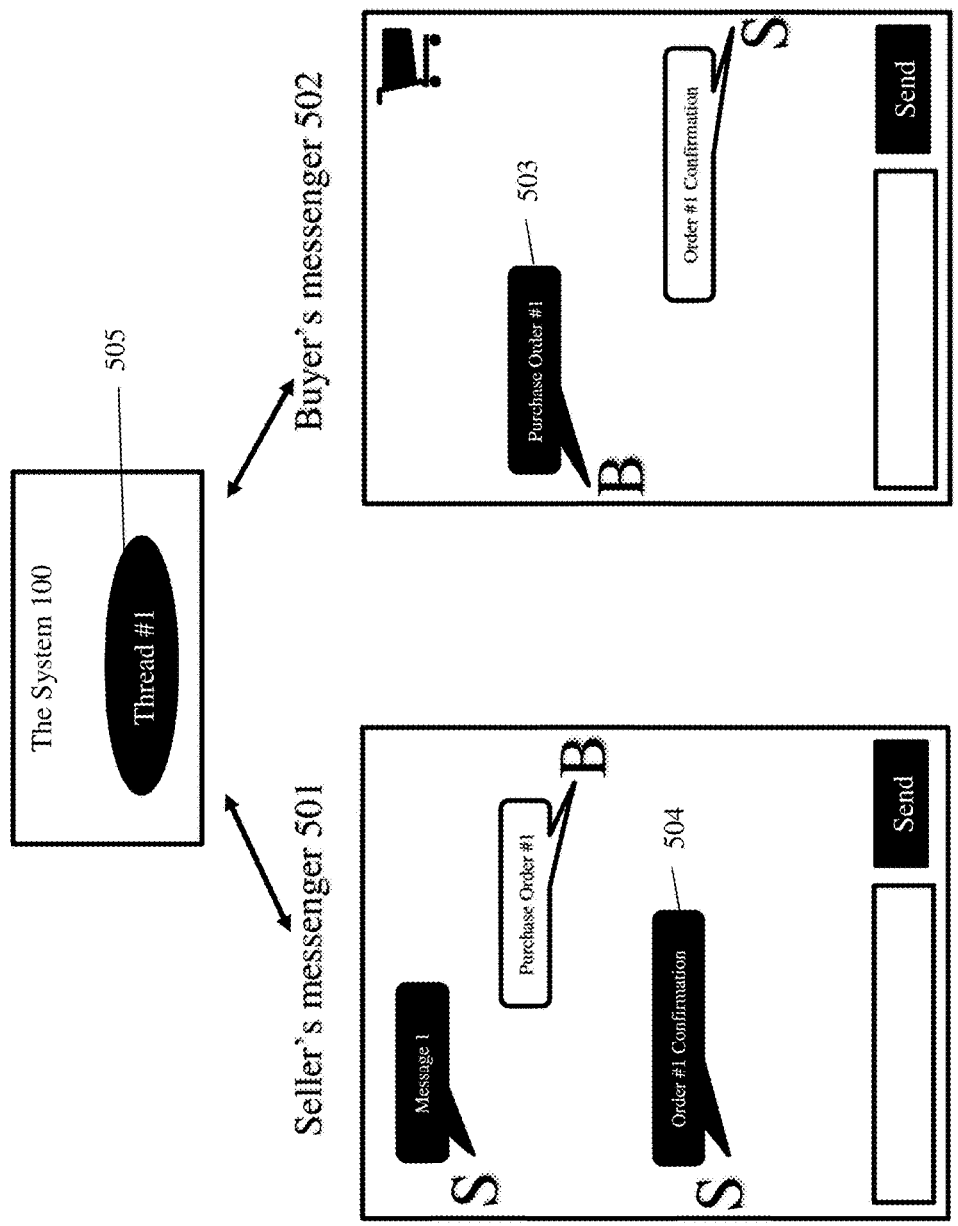
FIGS. 5-9 illustrate an example of using the electronic communication system to facilitate a mobile-based e-commerce transaction between a buyer and a seller.

As shown in FIG. 5, a seller and a buyer are communicating through the System 100 by using their instant messengers 501 and 502, respectively. To facilitate the communication, the System 100 creates Thread #1 505 for the purpose of transmitting instant messages between the seller and the buyer. The buyer's messenger 502 provides tools for the buyer to browse seller's products for sale and place orders. For example, if the buyer clicks on the shopping cart icon on the top right corner of the messenger 502, the messenger may pop up a window displaying seller's products. The buyer may choose and order the products he/she desires and pay for the order through the same or a different pop-up window. If the buyer places an order, the buyer's messenger 502 automatically creates and sends a purchase order 503 as an instant message to the System 100. The System 100 receives and transmits the purchase order 503 to the seller's messenger 501. The seller's messenger 501 displays the purchase order and the seller can manually send out an order confirmation message 504 to confirm the acceptance of the purchase order. Alternatively, the seller may configure the setup of his/her store to automatically sends the order confirmation message 504 to the buyer. As shown in FIG. 5, the purchase order and order confirmation messages were communicated via Thread #1 505 between the seller and the buyer. Other messages may also be communicated via Thread #1 505. For example, the Thread may be facilitating a group chat and there may be other buyers on Thread #1 505, but a buyer cannot see other buyers' orders or private messages.

Figure 6:
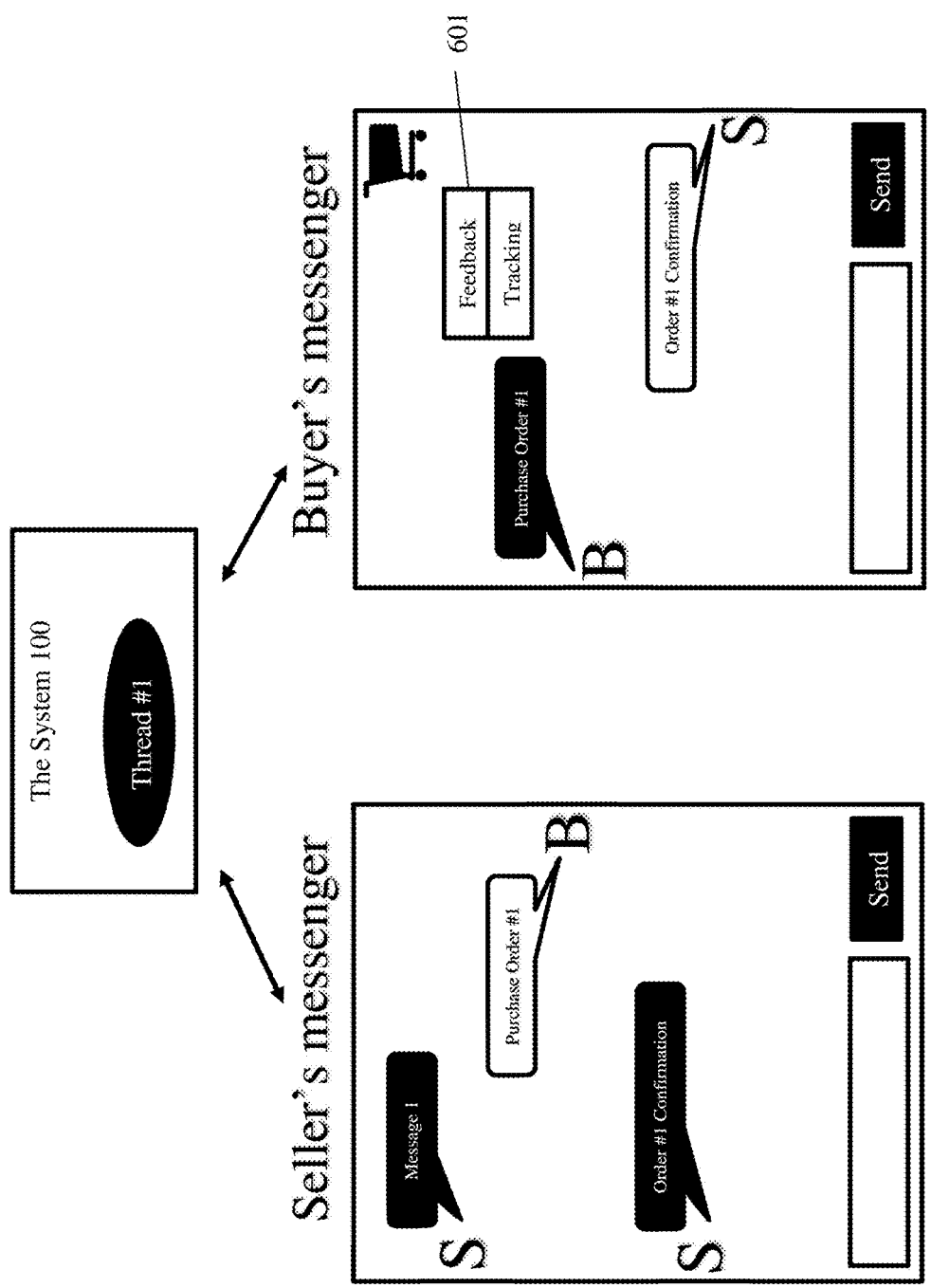
Figure 7:
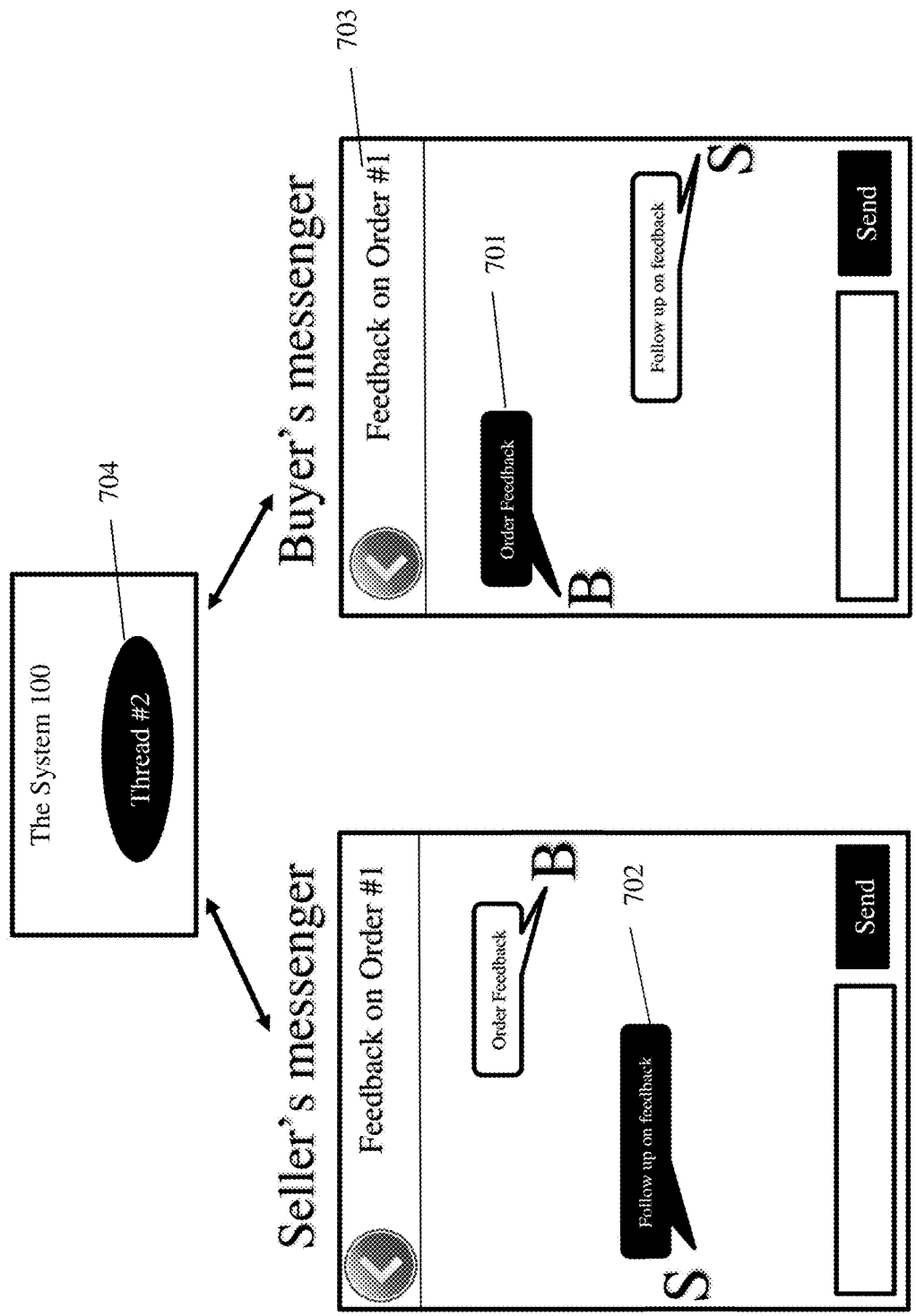

FIG. 6 illustrates the scenario where the buyer wants to follow up on the purchase order he or she just placed. The buyer may click on the purchase order message and the buyer's messenger will display a pop-up menu 601. As shown, the pop-up menu 601 includes two options, the feedback option for the buyer to provide feedback regarding the purchase order or the ordered product(s) and the tracking option for the buyer to track the shipment of the product(s). Assuming the buyer chooses the feedback option, then the buyer's messenger sends a request to the System 100 indicating the buyer intends to provide feedback on the particular purchase order or the ordered product(s). Upon receiving the request, the System 100 creates a new Thread. Meanwhile, the buyer's messenger displays a new user interface where the buyer can provide feedback information on the purchase order or the product(s). FIG. 7 illustrates this scenario, where buyer's messenger uses label 703 to show that the current messaging environment is about providing feedback on a purchase order or the product(s). Here, buyer typed in a feedback message 701 to provide his or her feedback. On the seller's side, after receiving the buyer's feedback message 701, the seller may send a follow-up message 702 to follow up with the buyer. All of these messages were communicated via the new Thread, Thread #2 704.

Figure 8:
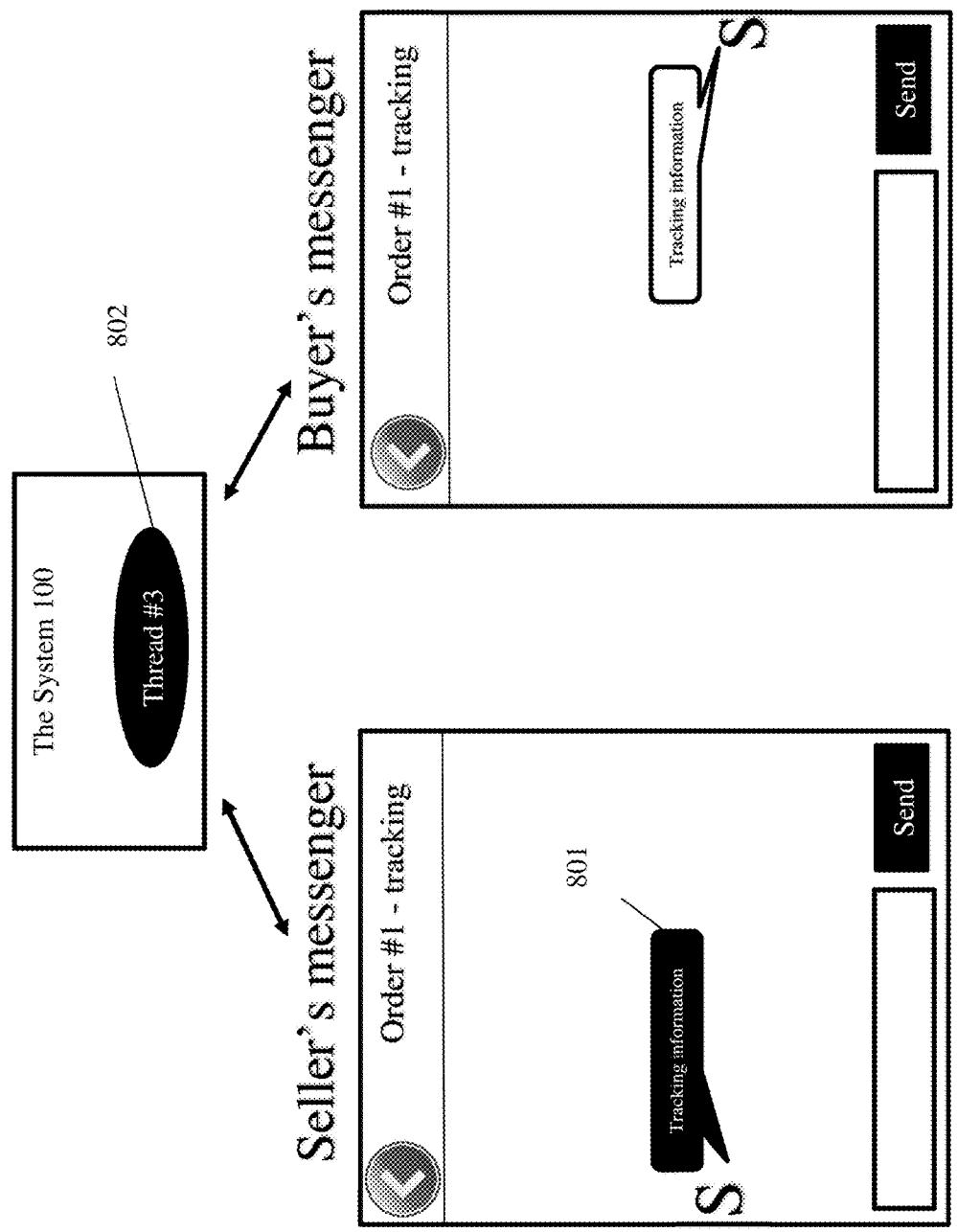

FIG. 8 shows another scenario where the buyer wants to track the shipment of the product(s) he or she ordered. Here, upon receiving the buyer's request from the buyer's messenger, the System 100 creates a new thread, Thread #3 802, for the purpose of tracking the shipment of the order. When tracking information is ready, the seller sends out an instant message 801 containing the tracking information to the buyer through this Thread #3 802.

Referring back to FIG. 7, upon creating Thread #2 704, the System 100 associates Thread #2 704 with the purchase order message 503. Similarly, upon creating Thread #3 802 (as shown in FIG. 8), the System 100 associates Thread #3 802 with the purchase order message 503 as well. In one embodiment, the association may be implemented with a data structure recording the connection, link, or reference between the Thread and message at issue. When the System 100 transmits the particular message to a user's messenger, the System 100 informs the messenger that the particular message has one or more associated Threads. Thus, the user's messenger can handle the message differently from other messages. For example, the message may be displayed in different color to indicate to the user that he/she can click on it to enter into a different Thread associated with the message. The association described here may be differentiated from the association between an instant message and a Thread when the instant message is part of the Thread. A flag or attribute may be used in the corresponding data structure representing the association. When a user clicks on such a "special" message and enters into a new Thread associated with the "special" message, the System 100 transmits all or certain number of messages of the Thread to the user's messenger for display.

Figure 9:
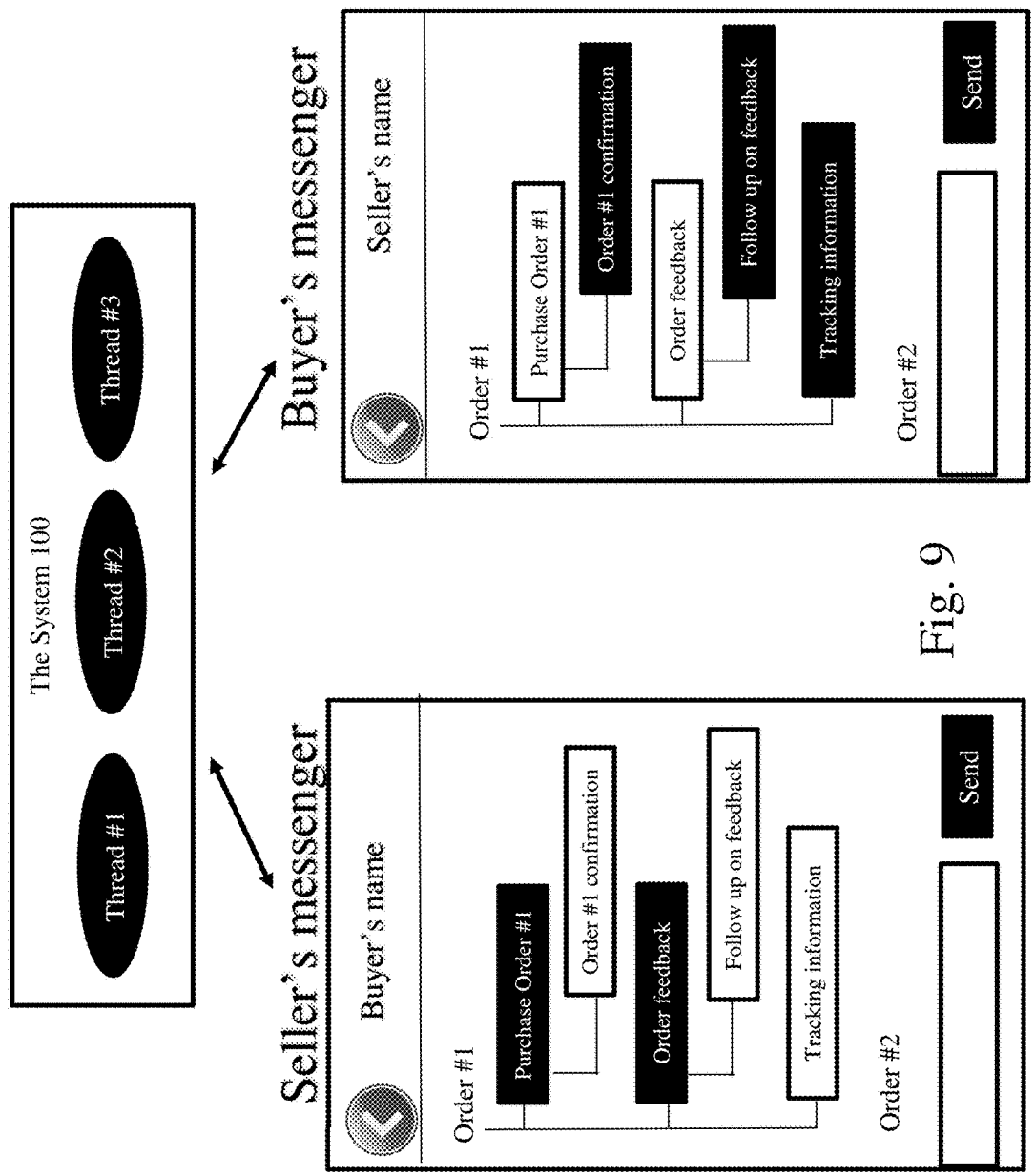

In one embodiment, as shown in FIG. 9, the seller's messenger or the buyer's messenger may display all messages of Thread #1, Thread #2, and Thread #3 in one display window so that the seller or buyer can have an overall view of all messages communicated between them two. For example, the messages may be displayed as a collapsible tree structure organized by orders.

Figure 10:
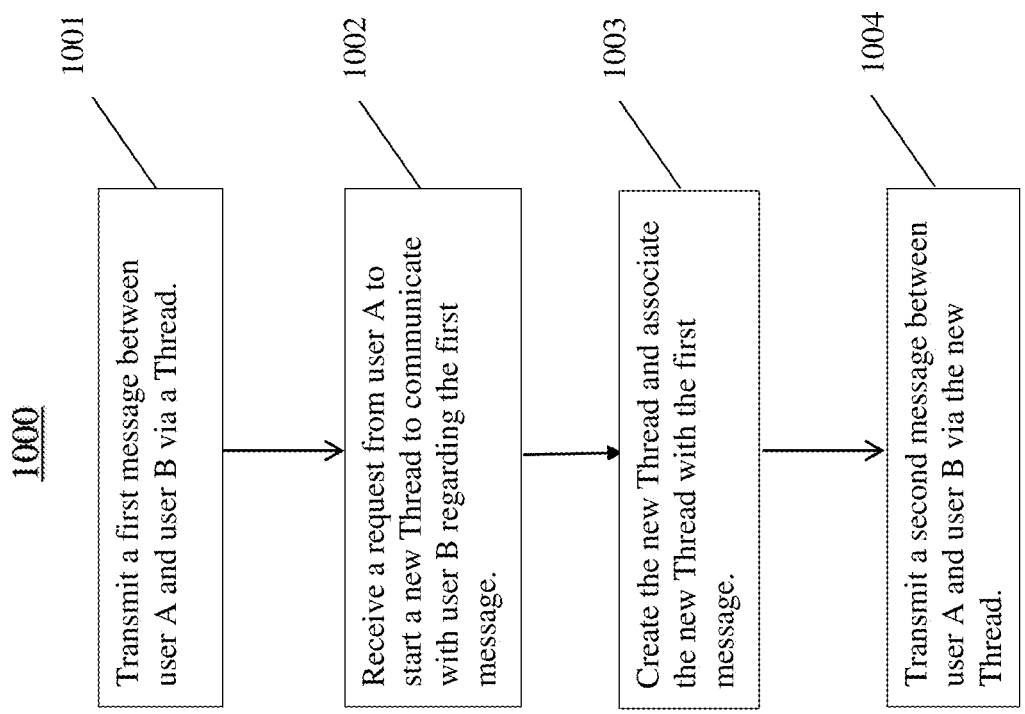
FIG. 10 is a flow diagram illustrating a process of implementing "two-dimensional messaging" based on Threads.

FIG. 10 is a flow diagram illustrating a process 1000 of implementing the "two-dimensional" messaging mechanism described above in connection with FIGS. 5-9. In one embodiment, the process 1000 is executed by the application controller 101 of the electronic communication system shown in FIG. 1. Here, it is assumed that the process 1000 is currently providing instant messaging service between user A and user B via a first Thread.

At step 1001, the process 1000 receives a first message sent from user A to user B. The process 1000 transmits the first message to the instant messenger of user B. Referring back to the example illustrated in FIGS. 5-9, user A could be the buyer, user B could be the seller, and the first message could be the purchase order.

At step 1002, the process 1000 receives a request from user A to start a new Thread to communicate with user B regarding the first message or the subject matter of the first message. Referring back to the example illustrated in FIGS. 5-9 again, this request could be user A's request to provide feedback on the purchase order or user A's request to track the shipment of the order.

At step 1003, the process 1000 creates a new Thread and associate the new Thread with the first message.

At step 1004, the process 1000 receives a second message from user A via the new Thread and transmits the second message to user B via the new Thread.

Figure 11A:
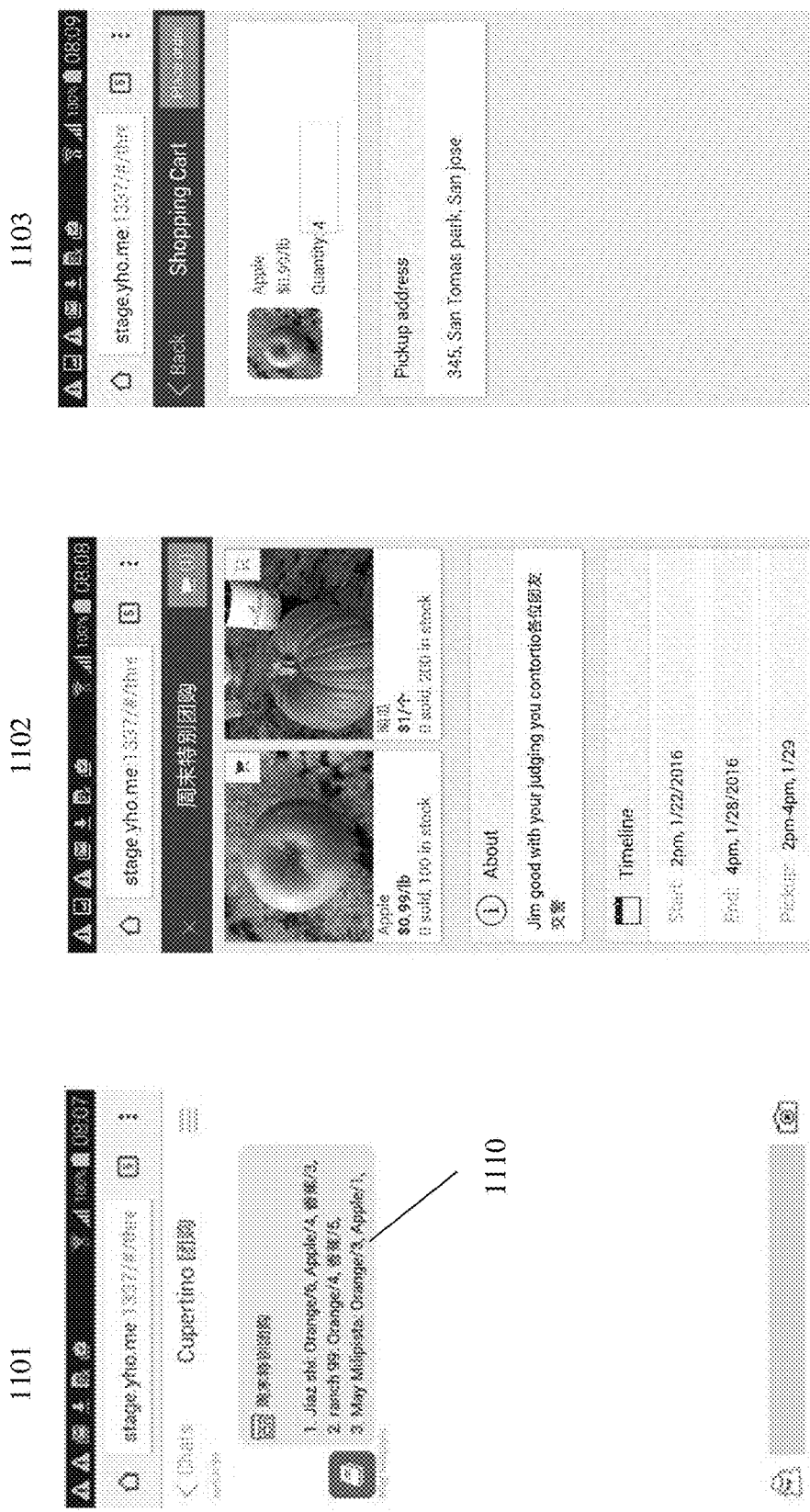
FIG. 11A-11B illustrate an example of using the electronic communication system to facilitate a mobile-based group order transaction.
Figure 11B:
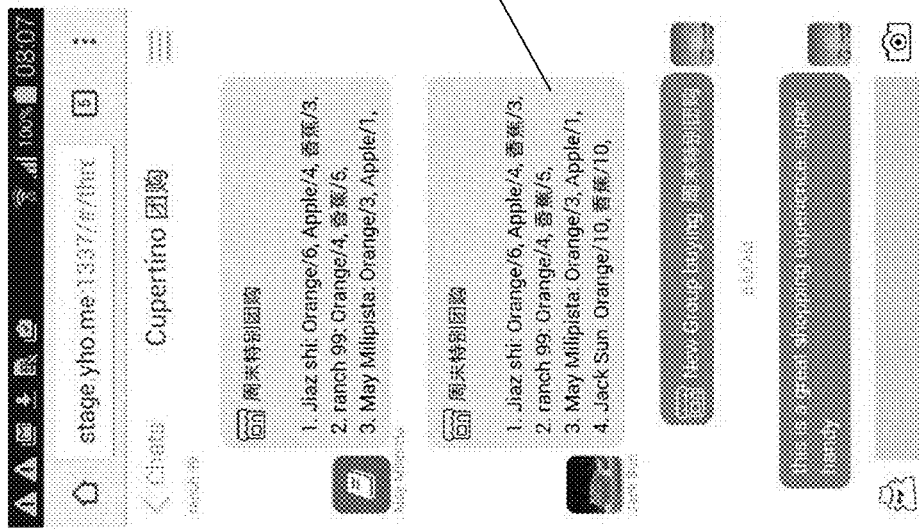

FIGS. 11A-11B illustrate an example of using the System 100 to facilitate a mobile-based group ordering process. In one embodiment, a seller may post a message to offer a group ordering opportunity. A buyer may click or tap on the group order message in his/her messenger to place an order. Once a new customer order was placed, the group order message is updated or a new group order message is created to include the new customer order. For example, as shown in FIG. 11A, the group order message 1110 in screen 1101 of a messenger now includes three customer orders. If a user of the messenger clicks or taps on the group order message 1110, the user is prompted with screen 1102 where he/she can order products. Upon clicking or tapping the shopping cart in screen 1102, the user is prompted with the checkout screen 1103 where he/she can make payment for the order. Upon receiving the order, the System 100 creates a new group order message 1120 (shown in FIG. 11B) to include the new customer order. Alternatively, the System 100 may just update the same group order message to include the new customer order without creating a new message.

The same mechanism or process described in FIGS. 11A-11B may also be applied to other applications, such as group RSVP, voting, etc. In all such applications, the message (such as the group order message) is a "smart message" in that it is used for triggering a special process (e.g., group order, group RSVP) executed within the same messenger environment and in return the execution of the special process affects or changes the content of the message.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method for electronic communication via an instant messenger on a mobile device, the method comprising:
   displaying a first instant message received from a remote user in a first conversation thread between a local user of the mobile device and the remote user in the instant messenger;
   receiving a user action by the local user on the first instant message;
   displaying a plurality of options in response to the user action;
   receiving a selection of one of the plurality of options by the local user;
   creating a second conversation thread, in response to the local user's selection of the one of the plurality of options, for communication between the local user and the remote user regarding the first instant message;
   transmitting a plurality of second instant messages between the local user and the remote user in the second conversation thread; and
   displaying the second conversation thread and the plurality of second instant messages in response to a subsequent selection of the one of the plurality of options by the local user.

2. The method of claim 1, wherein the user action comprises a click.

3. The method of claim 2, wherein the plurality of options comprises a menu list.

4. A mobile device comprising:
   a display for displaying an instant messenger,
   a memory for storing instructions, and
   a processor which, upon executing the instructions, performs a process comprising:
      displaying a first instant message received from a remote user in a first conversation thread between a local user of the mobile device and the remote user in the instant messenger, receiving a user action by the local user on the first instant message, displaying a plurality of options in response to the user action, receiving a selection of one of the plurality of options by the local user, creating a second conversation thread, in response to the local user's selection of the one of the plurality of options, for communication between the local user and the remote user regarding the first instant message, transmitting a plurality of second instant messages between the local user and the remote user in the second conversation thread, and displaying the second conversation thread and the plurality of second instant messages in response to a subsequent selection of the one of the plurality of options by the local user.

5. The mobile device of claim 4, wherein the user action comprises a click.

6. The mobile device of claim 5, wherein the plurality of options comprises a menu list.

\* \* \* \* \*